March 24, 1931.  W. E. CUMMINS  1,797,943
DEFLECTION RECORDER
Filed Oct. 21, 1929  3 Sheets-Sheet 1
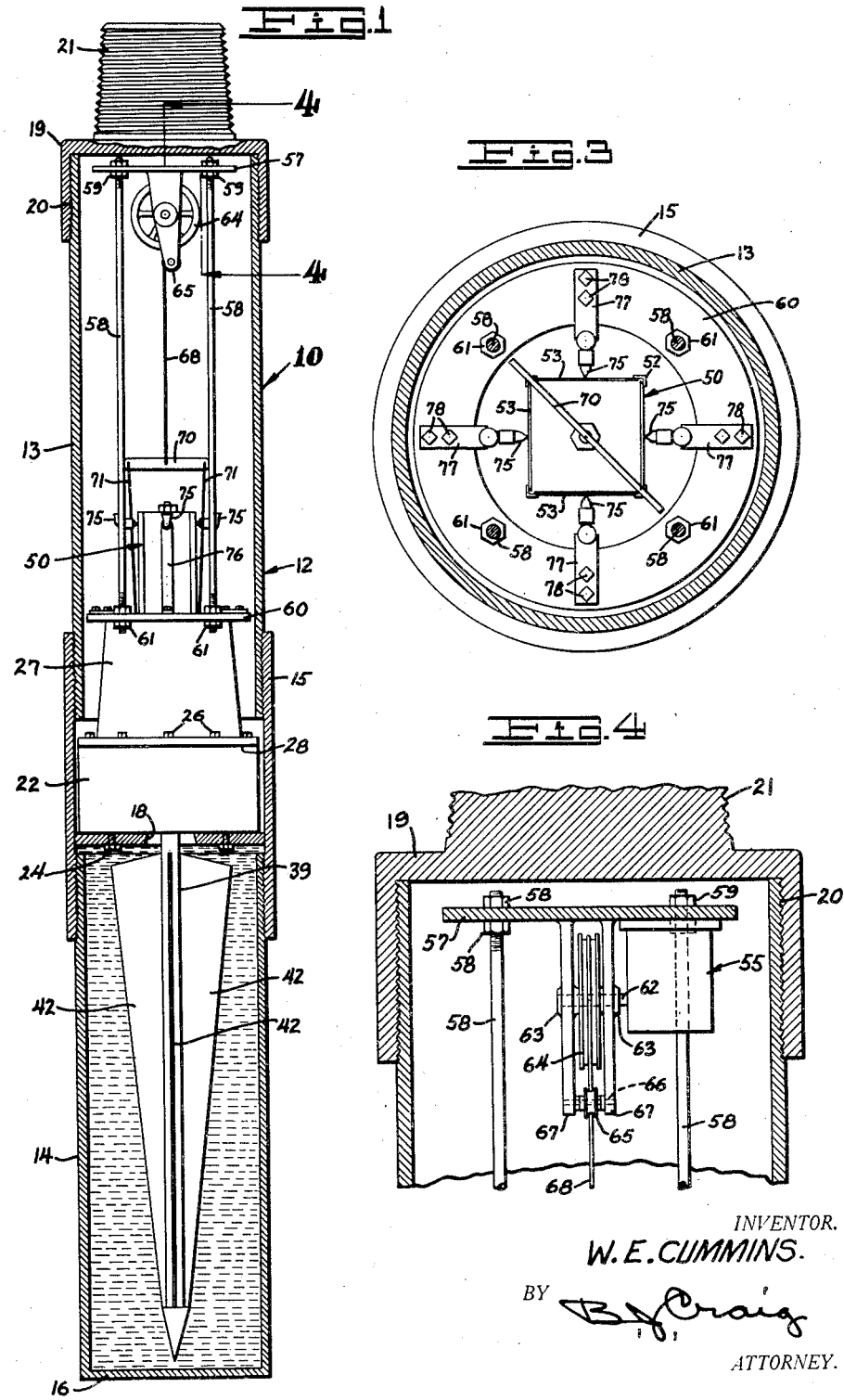
INVENTOR.
W. E. CUMMINS.
BY B. J. Craig
ATTORNEY.

March 24, 1931.  W. E. CUMMINS  1,797,943
DEFLECTION RECORDER
Filed Oct. 21, 1929  3 Sheets-Sheet 2
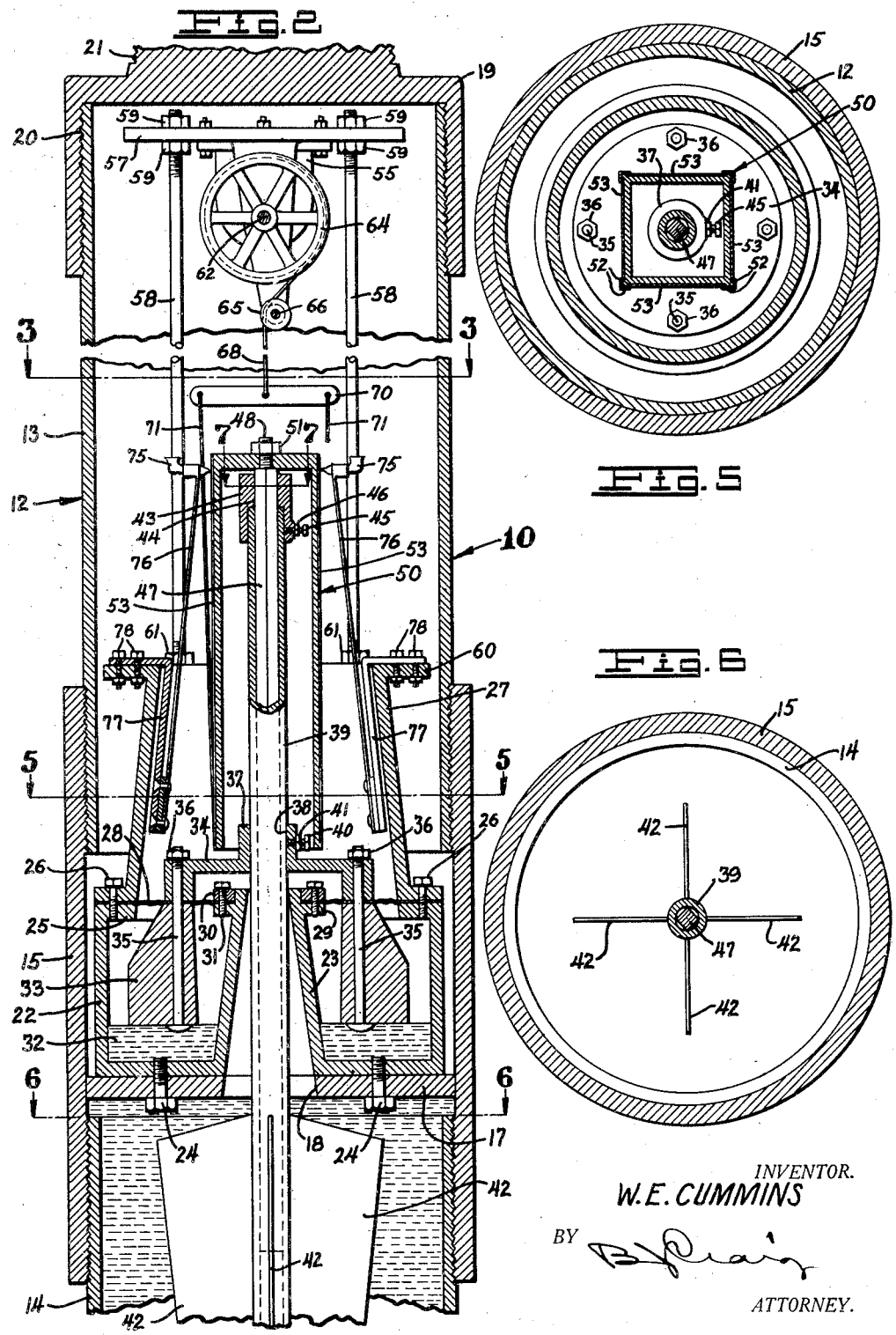
INVENTOR.
W. E. CUMMINS
BY
ATTORNEY.

March 24, 1931. W. E. CUMMINS 1,797,943
DEFLECTION RECORDER
Filed Oct. 21. 1929 3 Sheets-Sheet 3
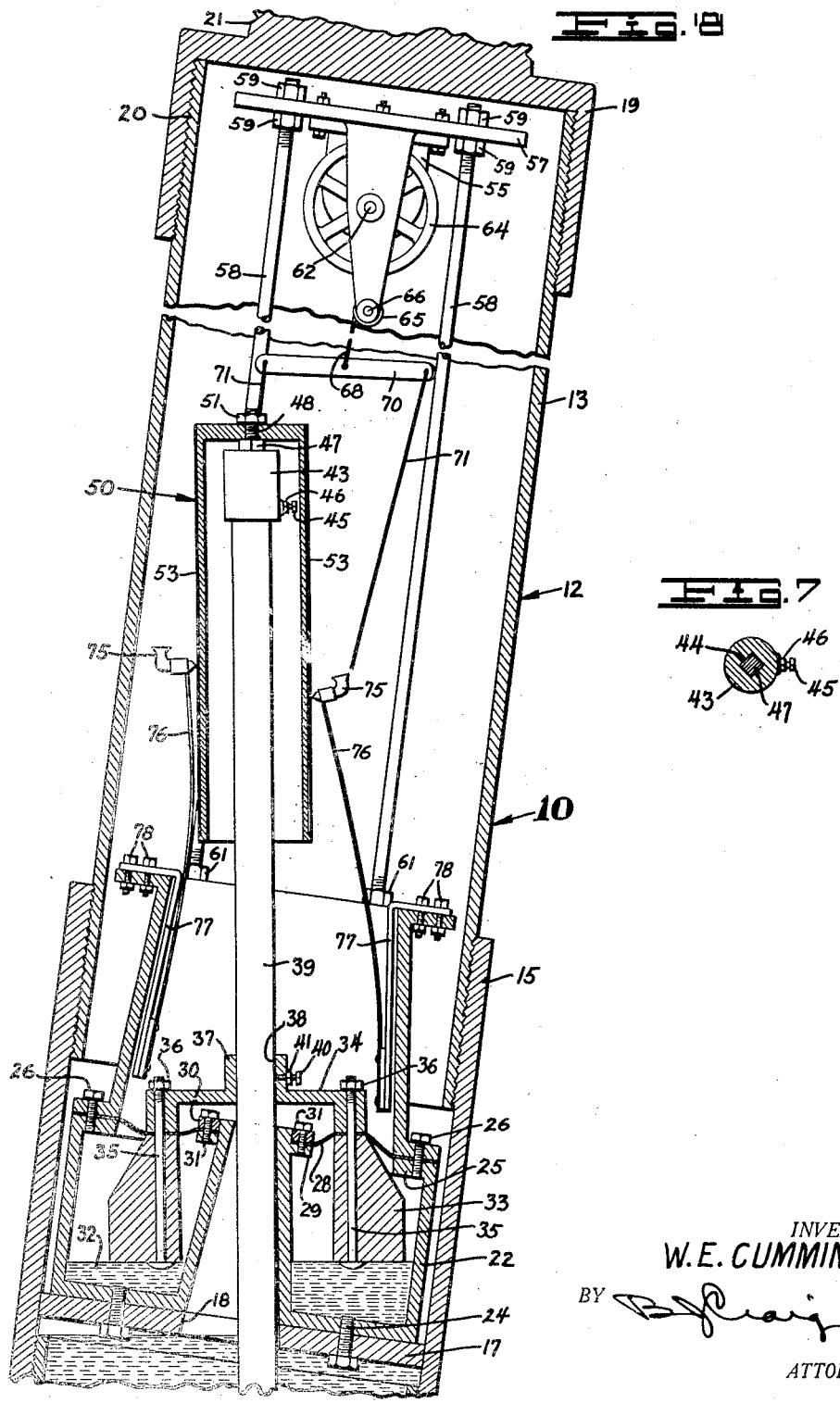
INVENTOR.
W. E. CUMMINS.
BY
ATTORNEY.

Patented Mar. 24, 1931

1,797,943

UNITED STATES PATENT OFFICE

WALTER E. CUMMINS, OF SANTA MARIA, CALIFORNIA, ASSIGNOR OF ONE-HALF TO RAYMOND F. HOLSER, OF SANTA MARIA, CALIFORNIA

DEFLECTION RECORDER

Application filed October 21, 1929. Serial No. 401,029.

This invention relates to improvements in indicators.

The general object of this invention is to provide an improved means for determining the deflections of bore holes such as oil wells.

Another object of the invention is to provide a device of the class described including improved means for graphically recording the deflections of a bore hole.

A further object of the invention is to provide an indicator as described including a float sustained by mercury and adapted to retain a chart frame in a correct vertical position.

Another object of the invention is to provide means for damping the swing of the chart frame.

Other objects of the invention will be apparent from the following description taken in connection with the accompanying drawings wherein:

Fig. 1 is an elevation of my improved indicator with the casing in section.

Fig. 2 is a fragmentary enlarged central vertical section through my improved device.

Fig. 3 is a section taken on line 3—3 of Fig. 2.

Fig. 4 is an enlarged section taken on line 4—4 of Fig. 1.

Fig. 5 is a section taken on line 5—5 of Fig. 2.

Fig. 6 is a section taken on line 6—6 of Fig. 2.

Fig. 7 is a section taken on line 7—7 of Fig. 2 and

Fig. 8 is a view similar to Fig. 2, showing the device tilted.

Referring to the drawings by reference characters I have indicated my improved indicator generally at 10. As shown the device 10 comprises a casing 12 which includes an upper section 13 and a lower section 14 secured together by screw threaded engagement with a coupling collar 15. The lower end of the lower section 14 is closed by a transverse partition 16 and the coupling collar 15 includes a transverse partition 17 which is provided with a central aperture 18. The upper end of the upper secton 13 is closed by a cap 19 which is secured thereto by screw threaded engagement as indicated at 20 and includes a reduced screw threaded shank 21 by which the device is adapted to be secured to a string of drill tubing.

Positioned above the partition 17 I provide a container 22 which includes a tapered central conduit 23 and is shown as secured to the partition 17 by a plurality of bolts 24. The container further includes an inwardly projecting upper flange 25 to which a supporting member 27 is secured by bolts 26. Across the top of the container 22 I provide a flexible diaphragm 28 which may be made of metal and the outer edge of which is clamped between the container flange 25 and the supporting member 27 and the inner edge of which is clamped between a flange 29 on the conduit 23 and a collar 30 which is secured to the flange 23 by a plurality of bolts 31.

Within the container 22 I provide a quantity of mercury 32. This mercury I deem of great importance as its use enables great accuracy to be obtained with my device. The mercury is adapted to support a float member 33, the top of which abuts the diaphragm 28. On the opposite side of the diaphragm from the float I provide a bracket 34 which is adapted to be secured to the float 33 by a plurality of bolts 35 and nuts 36 which when tightened clamp the diaphragm 28 between the float 33 and the bracket 34. The bracket 34 includes a central hub 37 having a central aperture 38 therein in which is positioned a cylindrical tube 39 which is adapted to be retained in engagement with the bracket by a set screw 40 including a lock nut 41. The tube 39 extends upward above the bracket and downward through the container conduit 23 and the partition aperture 18 into the lower section 14, where it is provided with a plurality of thin tapering vanes 42.

Adjacent the top of the tube 39 I provide a cap 43 which includes a square aperture 44 and is adapted to be retained in an adjusted position on the tube by a set screw 45 having a lock nut 46 thereon (see Figs. 2 and 5). Positioned in the square aperture 44 I provide a similarly shaped rod 47 which extends downward into the tube 39 and includes a reduced threaded shank 48 at its upper end.

A chart frame indicated generally at 50 is adapted to be secured to the rod 47 by a nut 51 which engages the screw threaded shank 48. As shown the chart frame 50 includes four faces, on each of which are provided slides 52 in which charts 53 are adapted to be removably positioned.

For lifting the chart frame 50 at a predetermined rate of speed I provide a clockwork mechanism which is indicated generally at 55 and may be of any desired type. This mechanism is shown as secured to a plate 57 which is secured to a plurality of threaded rods 58 by nuts 59 and the rods 58 are secured to an outwardly projecting flange 60 of the member 27 by a plurality of nuts 61.

The clock mechanism 55 includes a shaft 62 which is positioned in bearings 63 on the plate 57 and has secured thereto a pulley 64 and below the pulley 63 I provide an idler roller 65 which is secured to a shaft 66 positioned in bearings 67. One end of a cable 68 is secured to the pulley 64 and the opposite end thereof is secured intermediate the length of a bar 70 and the intermediate portion of the cable 68 is positioned over the idler roller 65. Adjacent each end of the bar 68 I secure other cables 71 which extend downwardly and are secured to the chart frame adjacent the bottom at diagonally opposed corners thereof.

For marking on the charts 53 I provide a plurality of pens 75 which are supported by flexible members 76 secured to frames 77 which in turn are removably secured to the flange 60 of the member 27 by a plurality of bolts 78. When the chart frame 50 moves upwardly the pens 75 are adapted to trace an ink line on their associated charts.

In operation the charts 53 are correctly positioned on the chart frame 50 which is then moved to a lowered position as shown in Fig. 2. The clockwork 55 is then started and the device is connected to a stand of drill tubing by means of the threaded shank 21 and then positioned so that one of the chart faces is directly to the north which may be accomplished by a suitable marking on the casing of the device. The device is then lowered into the well and as each stand of drill tubing is connected on to the preceding stand the rotary table is locked in position so that the device will not rotate but will at all times retain the correct chart to the north.

As the chart frame moves slowly the pens 75 make a vertical line on the charts but should the bore hole deviate from a true vertical the device 10 will tilt as shown in Fig. 8 which illustrates the relative positions of the various elements when the device is at an extreme angle of tilt. When the device tilts the mercury 32 (the use of which, as before stated is of great importance) retains the float 33 in a true horizontal position which in turn through the medium of the bracket 34, the tube 39 and the rod 47 retains the chart frame 50 in a vertical position. As the pen structures are carried by the supporting member 27 the charts 53 move relative thereto which causes the marking devices at right angles to the tilt to make a mark on their associated charts at an angle to the vertical center line of the charts thus indicating the angles of deviation of the bore hole.

As each stand of drill tubing is lowered into the well the time and number of feet of drill tubing in the hole is noted and as the chart frame is raised at a predetermined rate of speed by noting at what point on the chart the ink line deviated from a true vertical and comparing it with the time sheet it can be readily asserted at what number of feet the drill hole deviated from a true vertical. Also by noting the inclination of the deviated line the angle of deviation will be determined.

From the foregoing description it will be apparent that I have invented a highly efficient deflection recorder which can be economically manufactured and which is simple in operation.

Having thus described my invention I claim:

1. In a deflection recorder, a casing, recording means including a member movable laterally and longitudinally relative to the axis of said casing, a sealed fluid container in said casing, a float in said container and means whereby said float causes lateral movement of said member relative to the casing.

2. In a device of the class described, a hollow casing, a container in said casing, a quantity of mercury in said container, a float in said container, a chart frame subject to the movements of said float and marking device, said marking device being supported independent of said float and adjacent to said frame.

3. In a device of the class described, a hollow casing, a container in said casing, a quantity of mercury in said container, a float in said container, a bracket supported by said float, a chart frame movable relative to said bracket, said frame including means for retaining a chart thereon, means to raise said chart frame and a marking device, adjacent to said frame.

4. In a device of the class described, a hollow casing, a container in said casing, a quantity of mercury in said container, a float in said container, a bracket supported by said float, a tube means whereby said bracket supports said tube, a rod positioned in said tube, a chart frame secured to said rod, said frame including means for retaining a chart thereon, means to raise said chart frame, and marking device adjacent to said frame, said marking device being resiliently supported.

5. In a deflection recorder, a case, a recording device including a chart member and a plurality of markers in said case, means to cause continuous movement in one direction of said chart member relative to said markers, and float operated means to cause relative movement between said chart member and said markers in another direction.

6. In a deflection recorder, a hollow casing, a fluid container in said casing, a float in said container, a chart holding member, means to support said chart holding member whereby it is subject to the motions of said float, a marking device adjacent to said chart holding member, and means to move said chart relative to said marking device and independently of the movement caused by said float.

7. In a deflection recorder, a casing, a support in said casing and rigid with respect to said casing, a chart frame, means to mount said chart frame for movement in the casing along the normal longitudinal axis thereof, means enabling said chart frame to shift laterally relative to the longitudinal axis of said frame, means to move said frame along the longitudinal axis, means tending to prevent a shift of said frame when the axis of the casing is shifted and means to record on a chart on the frame the movement of the casing relative to the frame.

8. In a device of the class described, a hollow casing including a container a chart frame in said container, said frame including four faces, means for retaining a chart thereon, a plurality of marking devices, one for each face of said chart frame, and means to move said frame relative to said working devices when said casing is tilted.

9. In a device of the class described, a hollow casing, said casing including a container, a quantity of mercury in said container, a float in said container, means connecting said frame and float whereby said frame is subject to movement of said float, means to continuously move said frame and a plurality of marking devices, for said chart frame, said marking devices being supported by means secured to said casing.

10. In a device of the class described, a hollow casing, a container secured to said casing, a quantity of mercury in said container, a float in said container, a chart frame, means connecting said frame and said float, said frame including four faces, means for retaining a chart thereon, and a plurality of marking devices, one for each face of said chart frame, said marking devices being supported adjacent to said frame.

11. In a device of the class described, a hollow casing, a transverse partition in said casing, a container secured to said casing, the top of said container being open, a quantity of mercury in said container, a float in said container, a bracket secured to said float, said bracket supporting a hollow tube, a cap detachably secured to said tube, a rod movable through said cap, a chart frame secured to said rod, said frame including faces and means for retaining a chart thereon, means whereby when said clockwork operates said chart frame will be raised and a plurality of marking devices, disposed adjacent to said chart frame.

12. In a device of the class described, a hollow casing, a transverse partition in said casing, a container secured to said casing, a quantity of mercury in said container, a float in said container, a bracket secured to said float, said bracket supporting a tube, a cap detachably secured to said tube, an aperture in said cap, positioned in said aperture, a chart frame secured to said rod, said frame including four faces and means on each face for retaining a chart thereon, a clockwork and a pulley, means to support said clockworks and said pulley, a cable, one end of said cable being secured to said pulley and the opposite end thereof being connected to said chart frame whereby when said clockwork operates said chart frame will be raised and a plurality of marking devices, one for each face of said chart frame.

13. In a device of the class described, a hollow casing, a transverse partition in said casing, a container secured to said casing, the top of said container being open, a central conduit in said container, a quantity of mercury in said container, a float in said container, a flexible diaphragm across the opening of said container above said float and secured to said conduit and the sides of said container, a bracket secured to said float, said diaphragm being clamped between said float and said bracket, said bracket supporting a hollow tube, said tube extending through said container conduit, the portion of said casing below said transverse partition being filled with a fluid, a cap on said tube, an aperture in said cap, a rod positioned in said aperture, a chart frame secured to said rod, said frame including four faces and means on each face for retaining a chart thereon, a support secured to said container and a supporting frame secured to said support, a clockwork and a pulley supported by said supporting frame above said chart frame, said clockworks being adapted to rotate said pulley, an idler pulley on said supporting frame, a cable, a bar, one end of said cable being secured to said pulley, the opposite end thereof being connected to said chart frame, whereby when said clockworks operates said chart frame will be raised and a plurality of marking devices, one for each face of said chart frame.

14. In a device of the class described, a hollow casing, a transverse partition in said casing, a container secured to said casing, the top of said container being open, a central conduit in said container, a quantity of mercury in said container, a float in said container, a flexible diaphragm extending across the opening of said container above said float and secured to said conduit and the sides of said container, a bracket secured to said float, said diaphragm being clamped between said float and said bracket, a tube supported by said bracket, said tube extending through said container conduit, a plurality of vanes on said tube below said transverse partition, the portion of said casing below said transverse partition containing a fluid, a cap detachably secured to said tube, a rectangular aperture in said cap, a rectangular rod positioned in said aperture, a chart frame secured to said rod, said frame including four faces, means for retaining a chart thereon, a support secured to said container and a supporting frame secured to said support, a clockwork and a pulley supported by said supporting frame above said chart frame, said clockwork being adapted to rotate said pulley, an idler pulley on said supporting frame, a cable, a bar, one end of said cable being secured to said pulley, said cable passing over said idler pulley and the opposite end thereof being secured to said bar adjacent the center thereof, other cables secured adjacent each end of said bar, said other cables being secured to two opposite lower corners of said chart frame, whereby when said clockwork operates said chart frame will be raised, a plurality of marking devices, one for each face of said chart frame, said marking devices being supported by resilient members secured to said support.

In testimony whereof, I hereunto affix my signature.

WALTER E. CUMMINS.